H. McDERMOTT.
FRICTION TRANSMISSION MECHANISM.
APPLICATION FILED MAR. 28, 1921.

1,387,550.

Patented Aug. 16, 1921.
2 SHEETS—SHEET 1.

INVENTOR
H. McDermott
BY Munn & Co.
ATTORNEYS

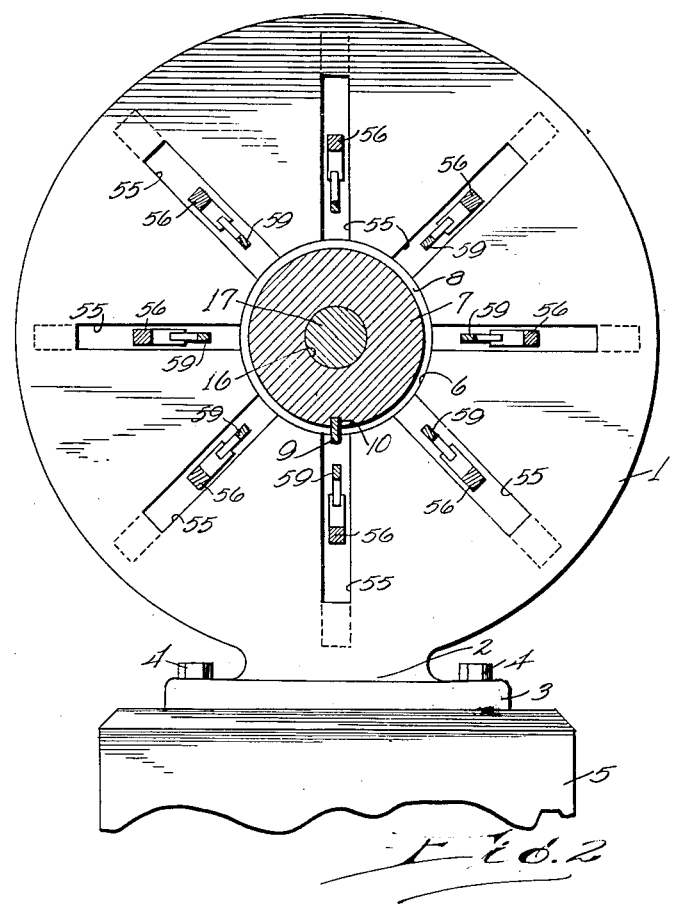

UNITED STATES PATENT OFFICE.

HENRY McDERMOTT, OF ELECTRA, TEXAS.

FRICTION TRANSMISSION MECHANISM.

1,387,550.  Specification of Letters Patent.  Patented Aug. 16, 1921.

Application filed March 28, 1921. Serial No. 456,066.

*To all whom it may concern:*

Be it known that I, HENRY McDERMOTT, a citizen of the United States, and a resident of Electra, in the county of Wichita and State of Texas, have invented a new and useful Improvement in Friction Transmission Mechanism, of which the following is a full, clear, and exact description.

My invention relates to improvements in friction transmission mechanisms, and it consists in the combinations, constructions and arrangements herein described and claimed.

An object of my invention is to provide a device of the character described in which means are provided for imparting a driving force from the drive shaft to a shaft to be driven without the use of the usual gears, chain and sprocket mechanism, or belt and pulley device.

A further object of my invention is to provide a device having a novel form of friction actuated mechanism for transmitting motion from one shaft to another.

A further object of my invention is to provide a device of the character described in which means are provided for reversing the direction of movement of the driven shaft at will.

A further object of my invention is to provide a friction transmission mechanism having means operable at will to vary the speed of the driven shaft.

Other objects and advantages will appear in the following specification, and the novel features of the invention will be particularly pointed out in the appended claims.

My invention is illustrated in the accompanying drawings, forming part of this application, in which—

Fig. 2 is a section along the line 2—2 of Fig. 1.

Figure 1:
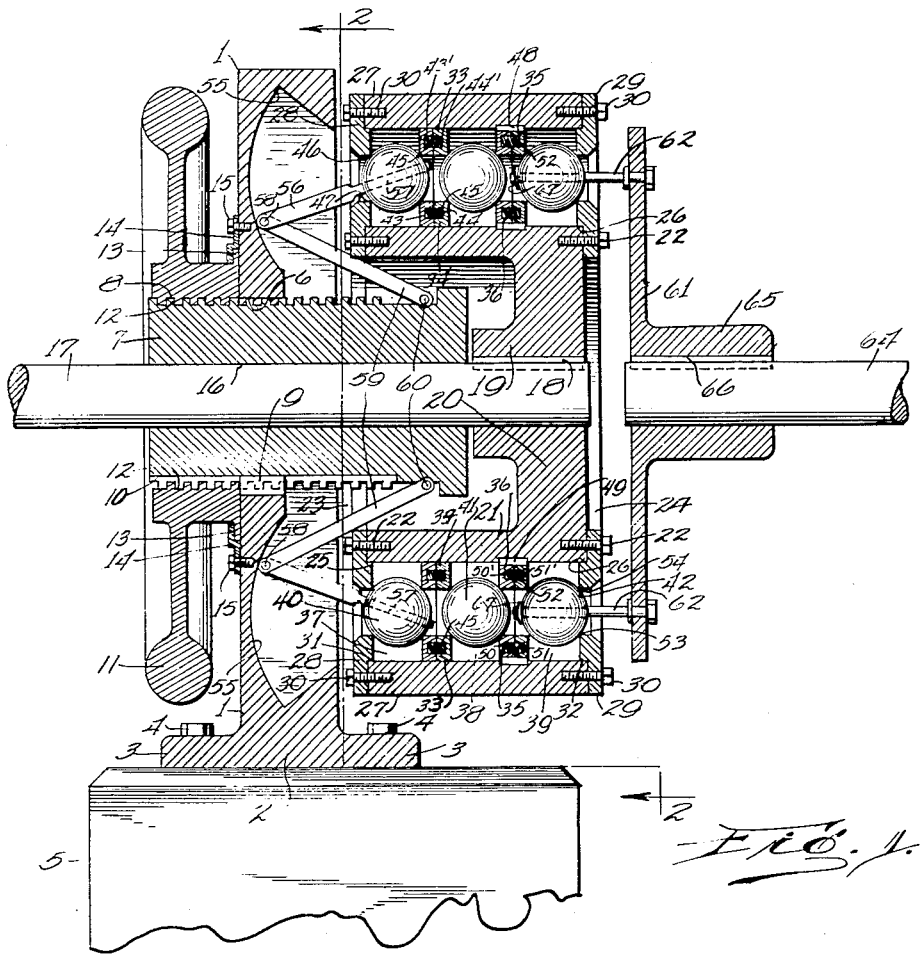
Figure 1 is a vertical central section through the device.

In carrying out my invention, I provide a frame or body portion 1 that has the form of an edgewise disposed disk and is formed integrally with a base 2, having a flange 3 secured in any suitable manner as by means of bolts 4 to a foundation or like supporting member 5. The frame 1 is formed with a central opening 6 adapted to receive a bushing 7 that is threaded exteriorly at 8 for a part of its length. The wall of the opening 6 has a slot therein adapted to receive a feather 9 that projects into a slot 10 in the bushing 7. The bushing 7 is thus held against rotation and may be slidably moved in the direction of its length. Such movement is occasioned when desired by operation of a hand wheel 11 having a hub formed with a threaded bore 12, adapted to engage with the threads 8 of the bushing, and with an annular flange 13, engaged by brackets 14 that are secured by screws 15 to the frame 1, so that rotation of the hand wheel is permitted and the latter is held against lateral movement relative to the frame. Consequently, rotation of the hand wheel will occasion a movement of the bushing 7 in the direction of its length.

The bushing 7 is formed with a bore 16 in which is rotatably mounted a drive shaft 17 having its end projecting beyond the bushing and having keyed thereon at 18 the hub 19 of a drive disk 20. The latter has an integral rim portion 21 extending toward the frame 1 beyond the adjacent end of the bushing 7 and being spaced from the latter, as shown. The rim 21 has secured thereto at its ends by screws 22 a pair of parallel annular members 23 and 24 enlarged respectively at 25 and 26 to provide annular shoulders adapted to overlie the periphery of the rim 21 and to extend radially therebeyond. The peripheries of the annular members 23 and 24 are concentric with the periphery of the rim 21. A cylindrical member 27 is arranged with its walls concentric with the periphery of the rim 21 and is maintained in that position by means which will now be described. Such means include a pair of annular members 28 and 29 secured to the ends of the cylinder by screws 30 and having enlarged extensions 31 and 32, respectively, abutting the inner wall of the cylinder 27 at the ends thereof and extending radially toward the peripheries of the corresponding annular members 23 and 24. The inner peripheries of the annular members 28 and 29 are concentric with the peripheries of the annular members 23 and 24. The space between the inner wall of the cylinder 27 and the peripheral wall of the rim 21 is divided by concentric rings 33 and 34 and concentric rings 35 and 36 to provide races 37, 38 and 39. A plurality of balls 40 are disposed within the race 37, a like number of balls 41 are disposed in the race 38, and the same number of balls 42 are disposed in the race 39 so that the cylinder 27 is maintained spaced from the rim 21. The ring member 33 is maintained in spaced concentric relation with the ring 34 by the rolling contact with the several parts thereof of the series of ball members 40 and 41. Each of the rings 33 and 34 comprises two similarly disposed annular sections formed with coöperating pockets 43—43' and 44—44' in the contiguous sides thereof and compression springs 45 have their ends disposed in these pockets so that the thrust thereof maintains the sections of the rings 33 and 34 in constant operative engagement with the balls 40 and 41 and also maintains the balls 40 in constant engagement with the inner edge 46 of the inner periphery of the annular member 28 and the like edge 47 of the outer periphery of the annular member 23 and maintains the balls 40 in operative engagement with adjacent sections of the ring 35 which is feathered at 48 to the inner wall of the cylinder 27 and with the adjacent section of the ring 36 that is feathered at 49 to the peripheral wall of the rim 21. The rings 35 and 36 likewise consist of annular sections having coöperating pockets 50—50' and 51—51' in their contiguous walls in which are disposed springs 52 serving to thrust the balls 41 against the adjacent sections of the rings 33 and 34 and the balls 42 against the inner edge 53 of the inner periphery of the annular member 29 and the outer edge 54 of the periphery of the annular member 24.

The frame 1 is formed with a plurality of radially extending recesses 55 in the face thereof adjacent to the annular members 28 and 23, the number of the recesses being determined by the number of balls working in the race 37. An arm 56 is provided for each recess and is formed with a relatively reduced end portion 57 on which one of the balls 40 is rotatably mounted. The respective arms 56 project within the corresponding recesses 55 and are pivoted at 58 to thrust rods 59, which are pivoted at 60 to the bushing 7 adjacent its inner end. The inner wall of each recess is curved, as clearly shown in Fig. 1, so that the arm 57 be shifted radially with respect to the center of the ball 40 mounted thereon when the bushing 7 is moved in the direction of its length. This is effected without interfering with the functional movement of the balls 40 since the inner wall of the recess 56 is arcuately curved and the joined ends of the arms 56 and the thrust rod 59 will always be supported thereby.

A driven disk 61 is maintained in adjusted position relative to the disk 20 by means of a plurality of bolts 62 which are arranged to enter the race 39 and to each project through a diametrically disposed opening through one of the balls 42. Each bolt has a nut 67 screwed on the end thereof so that the disk 61 is maintained in adjusted position relative to the disk 20 and the balls 42 are rotatably mounted on the bolts 62. It will be understood that the number of bolts 62 corresponds to the number of balls 42 and that when the disk 61 is connected as described, a shaft 64 disposed within a hub 65 of the disk 61 and keyed thereto at 66 will be co-axially alined with the drive shaft 17.

From the foregoing description of the various parts of the device, the operation thereof may be readily understood. A driving force is imparted to the shaft 17 by any suitable mechanism (none being shown). The disk 20 will be driven at the speed and in the direction of the shaft 17. The balls 40 disposed within the race 37 are held against revolution about the shaft 17 and consequently will each rotate about its axis in the direction opposite to that of the disk 20. The inclination of the axis of the balls 40 is determined by the position of the arms 56 and the positions of the arms 56 may be varied by moving the bushing 7 in the direction of its length. When the axis of each of the balls 40 is inclined as illustrated in Fig. 1, a driving force will be transmitted from the edge 47 of the annular member 23 to each of the balls 40 at a point nearer to the axis of that ball than the distance from the axis to the edge 46, at which point the driving force is transmitted to the cylinder 27 to effect the revolution of the latter about the shaft 17 in the direction opposite to that taken by the disk 20. The cylinder 27 will therefore be rotated at a speed greater than that of the disk 20. The ring 33 will be rotated in the same direction and at the same speed as the cylinder 27. The ring 34 will be rotated in the same direction as the disk 20 and at the same speed as the latter. The balls 41 will each revolve about its axis at the same speed and in the same direction as the balls 40. Since the cylinder 27 is being rotated at a greater speed than the disk 20, the engagement of the edge 53 of the disk 29 with the balls 42 will cause rotation of the latter in the same direction and at the same speed as the cylinder 27. Consequently, the shaft 64 will be driven at the same speed as the cylinder 27 and in the same direction. To decrease the speed of the driven shaft 64, the bushing 7 is moved in the direction of its length to raise the outer end of the arm 56. As the axis of the balls 40 are moved parallel with that of the shaft 17, the speed of rotation of the disk 20 and the cylinder 27 will be equalized so that the balls 42 will each rotate on its axis without revolving about the axis of the shaft 17 and consequently the shaft 64 will not be driven. As the arms 56 are raised until the axis of each of the balls 40 is adjacent to the contact point 46, the disk 20 will be rotated at a greater speed than the cylinder 27 and consequently the balls 42 will be rotated at the same speed and in the same direction as the disk 20. The shaft 64 will then be driven in the same direction as the shaft 17. It will thus be observed that the ratio of the speed of the cylinder 27 to that of the disk 20 varies directly with the ratio of the distance from the contact point 47 to the axis of each of the balls 40 to the distance from the contact point 46 to the same axis.

The balls 41 and the rings contacted thereby serve as thrust members and maintain the balls 40 and 42 in operative engagement with the rings 23 and 28 and with the rings 24 and 29, respectively.

I claim:

1. In a friction transmission mechanism, a drive shaft, means for supporting the drive shaft for rotation, a drive disk rigidly mounted on the drive shaft, said drive disk being formed with a laterally extending rim, means carried by the rim to provide an inner ball race member fixed to said rim, a freely movable outer ball race member, balls arranged in separated parallel series between said race members, means for preventing the revolution of the balls in one series about the axis of the drive shaft while permitting free rotation thereof about their respective axes, a shaft to be driven, a disk rigidly mounted thereon, and means rigidly connected with the axis of the series of balls remote from the first named series of balls for rotating the last named disk.

2. In a friction transmission mechanism, a driven shaft supported for rotation, a disk rigidly mounted on said shaft at its end and having a laterally extending rim, annular members secured to said rim to extend outwardly therebeyond and serving as inner race members, a cylinder having a diameter greater than that of the rim and a length equal to that of the latter, annular members secured to said cylinder at its ends to extend inwardly and serving as outer race members, means for dividing the race to provide a plurality of annular tracks, a plurality of balls disposed in each track to maintain the cylinder concentric with the rim of the drive disk, means embodying the axes of the several ball members in an end track for preventing the revolution thereof about the axis of the drive shaft, means for adjusting the last named means radially to determine the position of the axes of the ball members in the said end track with respect to the axis of the drive shaft, whereby the speed of the cylinder and the direction of revolution of the balls in the other end track is determined, a shaft to be driven, a disk rigidly mounted thereon, and means embodying the axes of the several balls in the second named end track and fixed in the last named disk for revolving the latter, said connectors being positioned equi-distant from the shaft to be driven and being parallel therewith.

3. In a device of the character described, a ball race comprising alined annular tracks, each having a like number of balls disposed therein, the outer members of the race being freely removable with respect to the corresponding inner members thereof and the common concentric walls contacted by the balls in one end track and the intermediate track being freely movable with respect to one another and to the inner and outer race members, means for supporting the ball race and for rotating the fixed inner members thereof, means embodying the axes of the balls in the first named end track for preventing revolution thereof about the axis of the inner race member, and means carried by said supporting means for moving radially the means embodying the axes of the balls to determine the positions of the axes of the latter relative to the axis of the inner race member, whereby the speed of the outer race member with respect to the speed of the inner race member and the speed and direction of revolution of the balls in the other end track are determined, a shaft to be driven, and means embodying the axes of the balls in the other end track and connecting with the last named shaft for driving the latter, said last named axes each being parallel with and equidistant from the axis of the inner race member and from the axis of the driven shaft.

HENRY McDERMOTT.